(12) United States Patent
Benestad

(10) Patent No.: US 6,640,641 B1
(45) Date of Patent: Nov. 4, 2003

(54) DEVICE FOR MEASURING A MEDIUM UNDER PRESSURE

(76) Inventor: Harald Benestad, Røahagen 34, N-0754 Oslo (NO)

( * ) Notice: Subject to any disclaimer, the term of this patent is extended or adjusted under 35 U.S.C. 154(b) by 0 days.

(21) Appl. No.: 09/623,848

(22) PCT Filed: Oct. 22, 1999

(86) PCT No.: PCT/NO99/00323

§ 371 (c)(1), (2), (4) Date: Sep. 8, 2000

(87) PCT Pub. No.: WO00/25102

PCT Pub. Date: May 4, 2000

(30) Foreign Application Priority Data

Oct. 23, 1998 (NO) .......................................... 19984966

(51) Int. Cl.$^7$ ................................................. G01L 9/12
(52) U.S. Cl. ............................... 73/718; 73/724; 73/756
(58) Field of Search .......................... 73/718, 724, 756, 73/706, 426, 861.42–761.69, 744–745, 729.2, 730

(56) References Cited

U.S. PATENT DOCUMENTS

| 4,587,840 A | * | 5/1986 | Dobler et al. ............. 73/119 A |
| 5,155,653 A | * | 10/1992 | Kremidas ................ 361/283.4 |
| 5,505,092 A | * | 4/1996 | Kowalski ..................... 73/730 |

* cited by examiner

Primary Examiner—Edward Lefkowitz
Assistant Examiner—Jermaine Jenkins
(74) Attorney, Agent, or Firm—Rodman & Rodman

(57) ABSTRACT

A device for capacitive measurement of a medium which at high pressure and optionally also at high temperature is bounded by a wall of a pressure housing or pressure resistance flow guide. The wall includes a cut out or through hole or a through going slot. In the hole or slot there is located a sensor and the sensor is electrically insulated from the material of the wall by the medium. The sensor is secured to the wall by means of a glass-ceramic material which extends from the pressure side of the wall and wholly or partly through the hole or slot. The sensor, at the outer side of the wall is connected to a capacitance-signal processing unit.

37 Claims, 3 Drawing Sheets

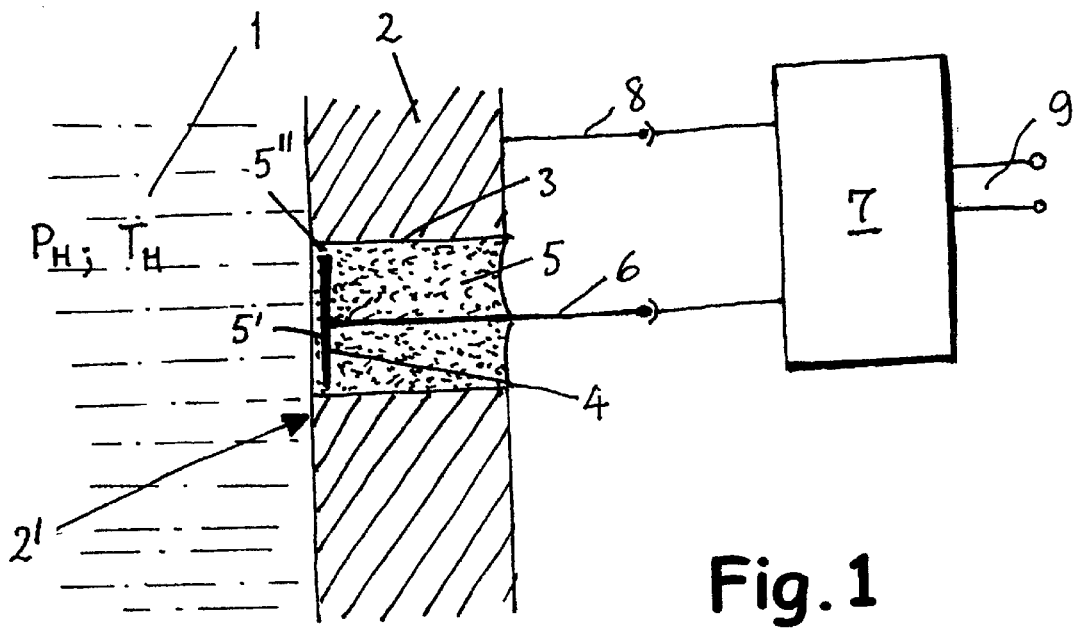
Fig. 1
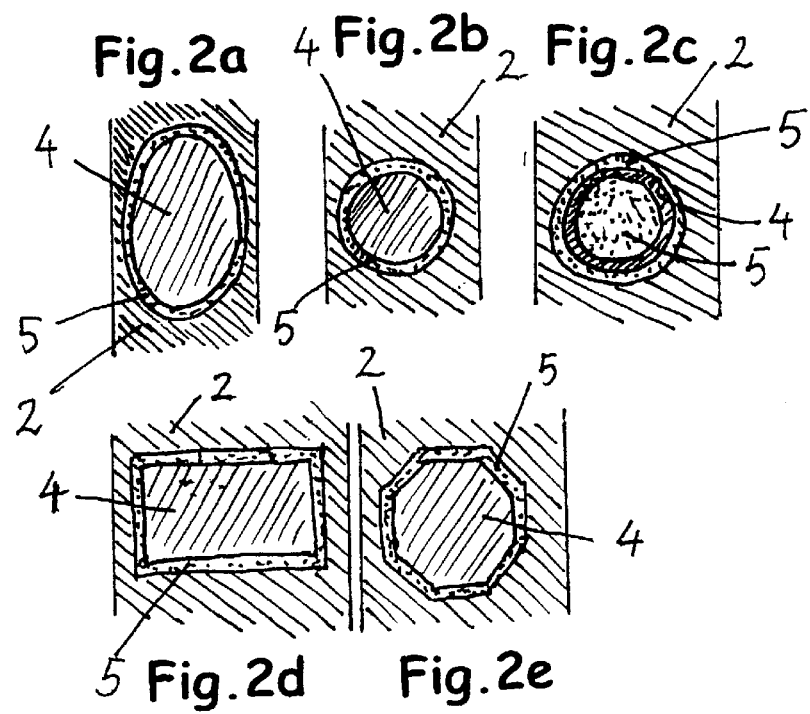
Fig. 2a  Fig. 2b  Fig. 2c
Fig. 2d  Fig. 2e

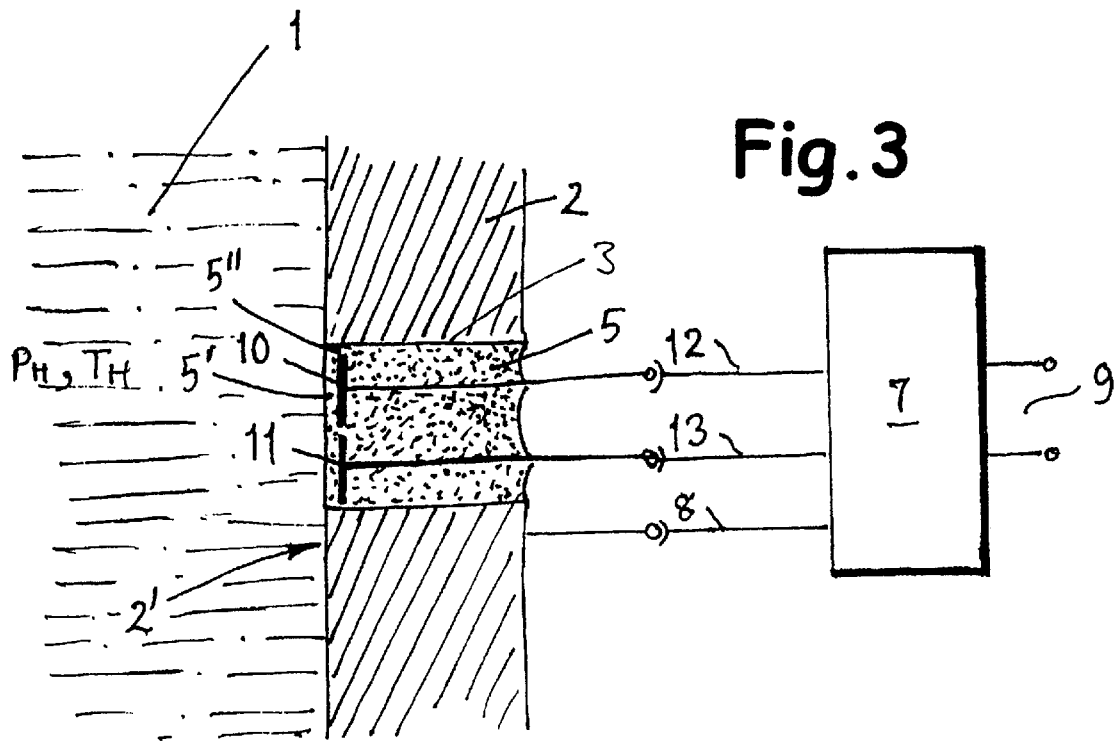
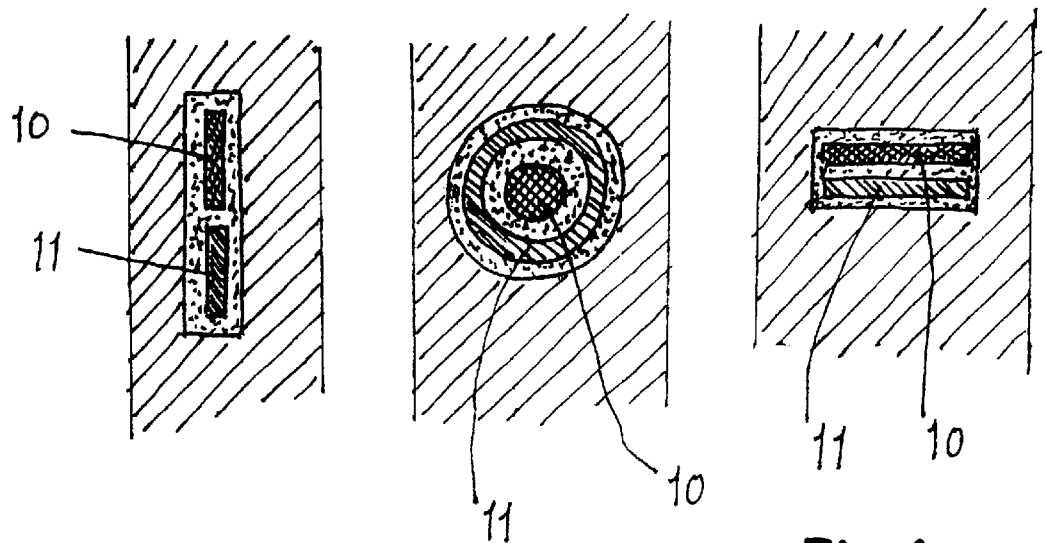

DEVICE FOR MEASURING A MEDIUM UNDER PRESSURE

A device for measuring at least one characteristic parameter of a medium which at high pressure, and optionally also at high temperature, is bounded by the wall of a pressure housing or a pressure-resistant flow guide, wherein in the wall there is cut out crosswise a through-hole or through-going slot, wherein through the hole or slot there is passed a connection to at least one sensor which is responsive to said at least one parameter, and wherein the sensor and the electrical connection thereof are electrically insulated from the material of the wall and anchored to the wall by means of glass-ceramic material extending from the pressure side of the wall and wholly or partly through the hole or slot.

A device of this kind is known, inter alia, from U.S. Pat. No. 4587840, where the sensor consists of a pressure-sensitive resistance layer on the surface of the glass-ceramic material facing the medium that is under pressure.

Other devices are also previously known, wherein capacitive sensors are located in the wall, usually with a plastic material as insulation between the sensor electrode and the wall and also the said medium. However, plastic is usually unsuitable for this purpose when a medium is at high pressure, and especially also at a high temperature, and when the wall, for example, is made of a material other than plastic, such as steel.

It is also previously known to place capacitive sensors behind glass, e.g., sheets of glass, but this method is typically used in environments where there is approximately equal pressure on either side of the sheet of glass. It is also known that if such capacitive sensors are placed on the back of glass elements, e.g., sheets of glass, where there is substantial pressure difference on opposite sides of the sheet of glass, the thickness of the sheet of glass will be a function of the pressure difference in order to prevent glass rupture. However, it is also known that the sensitivity of the capacitive sensor in such cases diminishes notably with increasing wall thickness. The present invention allows this problem to be resolved in a simple and efficient manner.

According to the invention, it is therefore proposed that the device is characterised in that the sensor consists of at least one capacitive sensor electrode that is electrically insulated from the said medium by means of the glass-ceramic material, wherein the glass-ceramic material which both surrounds the sensor electrode(s) and the connections and hermetically seals the hole or slot is homogeneous.

According to another embodiment of the device, the part of the sensor electrode facing the said pressure medium consists of an electrically conductive layer, sheet or film and in shape is selected from the group consisting of: circular, annular, round, oval, rectangular or polygonal shape.

The device is particularly suitable for use when the wall in the pressure housing or the flow tube is made of steel or another pressure-proof, preferably electrically conductive material.

The thickness of the glass-ceramic material which distances the sensor electrode from the said pressure medium is preferably in the range of 0.1 $\mu$m–10 mm, and the minimum thickness of the glass-ceramic material which distances the sensor electrode from the wall material is in the range of 0.1 $\mu$m–10 mm.

In a preferred embodiment, the sensor electrode is connected to a sensor input on a capacitance-responsive signal processing circuit, and the wall material is connected to a reference input on the signal processing circuit.

In one variant of the device, the sensor element may be a part of a capacitive pressure sensor for measuring pressure in the said medium or cavitation effect caused by contaminants, such, e.g., sand, in the said medium, during movement thereof in the pressure housing or flow guide, wherein the sensor element consists of at least one sensor electrode, and wherein the glass-ceramic material surrounding at least one surface of the sensor electrode and the connections and hermetically sealing the hole or slot is homogeneous, and wherein the pressure sensor also includes a reference electrode which is in galvanic contact with the material of the wall, the sensor electrode and the reference electrode being spaced apart from one another and together enclosing a dielectric fluid, e.g., air, gas or a gel material or a dielectric, elastically yielding element.

The part of the said at least one sensor electrode which faces the said pressure medium consists of an electrically conductive layer, sheet, film or the like, and the reference electrode is galvanically connected to the edge of the hole or slot facing the pressure medium or the wall of the hole or slot.

The wall of the pressure housing or flow guide is preferably made of steel or another pressure-proof, electrically conductive material.

The reference electrode may, e.g., be placed in the hole or slot, at a distance from the pressure side opening thereof, the reference electrode on the side thereof facing the said pressure medium being coated in this solution with a layer of glass-ceramic material which covers the entire cross-section of the said hole or slot, the material preferably being flush with the pressure side of the pressure housing or flow guide. The reference electrode may be welded, screwed or snap-fastened to the pressure housing or flow tube.

The sensor electrode on the side thereof facing the said pressure medium is advantageously coated with a layer of glass-ceramic material which covers the entire cross-section of the said hole or slot, the material preferably being uniform with the rest of the homogeneous, glass-ceramic material.

The thickness of the layer of the glass-ceramic material which distances the reference electrode from the said pressure medium is in the range of 0.1 $\mu$m–10 mm. Similarly, the thickness of the layer of the glass-ceramic material which distances the sensor electrode from the said dielectric fluid or element may be in the range of 0.1 $\mu$m–10 mm.

The minimum thickness of the glass-ceramic material which distances the sensor electrode from the wall material is in the range of 0.1 $\mu$m–10 mm.

The sensor electrode is connected to a sensor input on a capacitance-responsive signal processing circuit, and the reference electrode is via the wall material connected to a reference input on the signal processing circuit.

The invention will now be described in more detail with reference to the attached drawing figures.

FIG. 1 is a schematic illustration of the device according to the present invention.

FIG. 2 shows different shapes of the sensor.

FIG. 3 shows an alternative electrode configuration for the device according to the invention.

FIG. 4 shows in more detail alternative, different configurations of the sensor.

Figure 5:
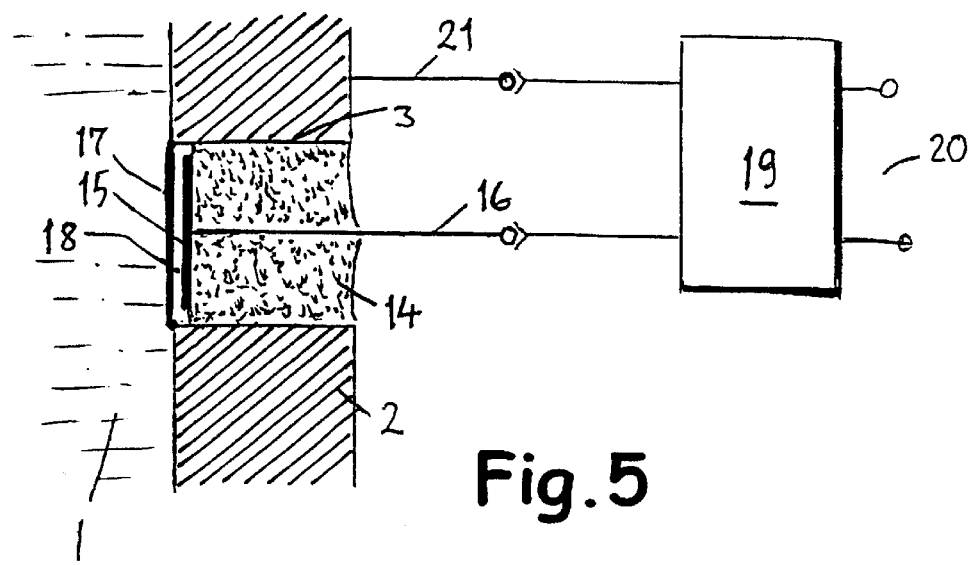
FIG. 5 shows the use of the principles of the invention in connection with a capacitive pressure sensor with associated signal processing circuit.

The present device is intended for capacitive measurement of a medium 1 which is at a high pressure $P_H$, and optionally also having a high temperature $T_H$, wherein the said medium is bounded by a wall 2 in a pressure housing or pressure-resistant flow guide if said medium, for example, is passed through a pipeline. In the wall 2 there is cut out transverse thereto at least one through-hole 3 or through-going slot. Furthermore, in the hole there is provided a sensor electrode 4 which is electrically insulated from the wall 2 material and the said medium 1 and is anchored to the wall 2 by means of a glass-ceramic material 5 which extends from the pressure side 2' of the wall and wholly or partly through the hole or slot 3. The sensor electrode 4 is via wiring 6 connected to a capacitance-responsive signal processing circuit 7. The circuit 7 also forms galvanic contact with the wall 2 via a wire 8. When a capacitance value is measured due to said medium, the circuit 7 is capable of emitting at its output 9 a characteristic signal.

In the alternative embodiment shown in FIG. 3, the sensor consists of two capacitive sensor electrodes 10, 11 which via respective connections 12, 13 are connected to the capacitance-responsive signal processing circuit 7. In addition, the circuit 7 may also have galvanic contact with the wall 2 via the wire 8, as shown and described in connection with FIG. 1.

The wall 2 is preferably made of steel or other good electrically conductive material.

The thickness of the glass-ceramic material 5' which distances the sensor electrode 4 from the said medium 1 is preferably in the range of 0.1 μm–10 mm.

The minimum thickness of the glass-ceramic material 5" which distances the sensor electrode from the wall material is preferably in the range of 0.1 μm–10 mm.

FIG. 2 shows alternative embodiments of the sensor electrode 4. FIG. 2a shows the sensor electrode 4 having an oval shape. In FIGS. 2b and 2c the sensor electrode is round or circular in shape. In FIG. 2d the sensor electrode has been given a rectangular shape, whilst the sensor electrode shown in FIG. 2e is polygonal in shape.

It will be appreciated that the glass-ceramic material is used as a dielectric medium against the medium 1 that is to be measured, whilst the glass-ceramic material 5 forms a pressure seal in the hole 3. The glass-ceramic material will normally form good chemical and mechanical anchorage to the wall 2 via the hole 3 walls. Thus, a good, hermetic seal is obtained, and at the same time the glass-ceramic material functions excellently as a dielectric medium.

FIG. 4 shows some additional alternative embodiments of the sensor which in this case consists of the capacitive sensor electrodes 10, 11. The sensor electrodes can, as indicated in FIG. 4a, consist of two elongate elements positioned one after the other. In FIG. 4b it is indicated that the elements can be concentric, wherein the element 10, e.g., is round, whilst the element 11 is approximately annular. In FIG. 4c it is indicated that the two electrode elements 10, 11 may be elongate and positioned in parallel relation.

Additional variants of the sensors shown in FIGS. 2 and 4 will, of course, be conceivable within the scope of the invention.

The present capacitive measuring device according to FIGS. 1–4 could be used, for example, for measuring dielectric properties of the said medium, the compositions of the medium or variations from a given standard, and optionally the level of the medium in a pressure tank.

Figure 6:
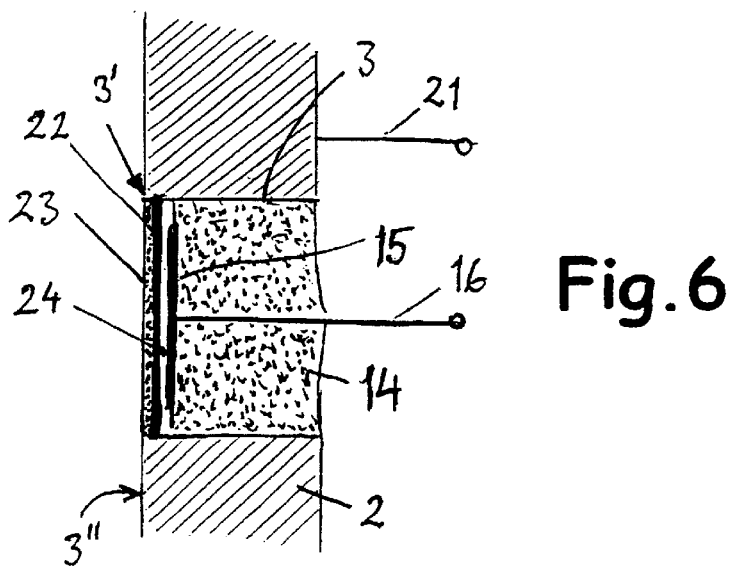
FIG. 6 shows a variant of the solution in FIG. 5.
Figure 7:
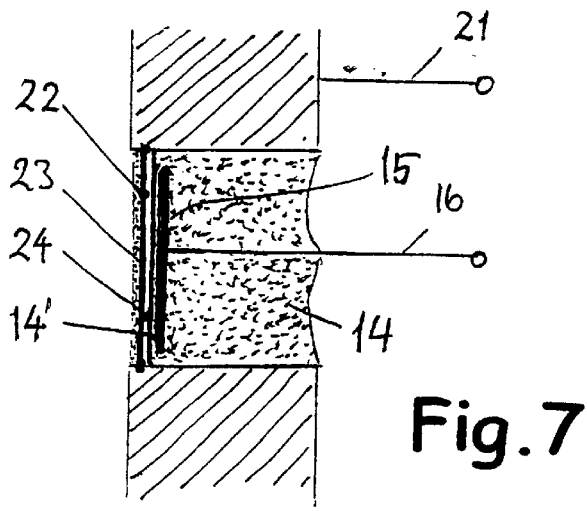
FIG. 7 shows a modification of the embodiment in FIG. 6.

In the solution shown in FIGS. 5–7 a capacitive sensor has been put into use to measure pressure in the medium 1 that is at high pressure, or cavitation effect caused by contaminants, such as, e.g., sand in the said medium 1 when this moves in the pressure housing or flow tube. It is essential to be able to measure the pressure in the said medium 1 in safe and simple manner, without running the risk of there being pressure crossover in the pressure housing or the pressure-resistant flow tube in the event of failure in the pressure gauge.

The transport of sand in a medium, such as, e.g., petroleum deposits recovered from the seabed, may easily wear down or cause cavitation in a pressure-constant flow guide, thus diminishing the resistance to pressure. It is therefore important to be able to measure the cavitation effect caused by contaminants at an early stage.

As shown in FIG. 5, the pressure sensor has a sensor element 15 which consists of at least one sensor electrode. The glass-ceramic material 14 that surrounds at least one face of the sensor electrode 15 and its connection 16, and which hermetically seals the hole 3 or slot must be understood to be homogeneous. The pressure sensor as shown in FIG. 5 also comprises a reference electrode 17 which is in galvanic contact with the wall 2 material. The sensor electrode 15 and the reference electrode 17 are spaced apart from one another and together they enclose a dielectric fluid or element 18, the said fluid, e.g., being air, gas or a gel material, although this should not be understood as defining the limits of the invention.

The reference electrode 17 is via the wall material 2 and the connection 21 connected to the signal processing circuit 19. The part of the sensor electrode 15 facing towards the said pressure medium 1 consists of an electrically conductive layer, sheet, film or the like. The reference electrode 17 will be galvanically connected to the edge of the hole or slot facing the pressure medium 1, as shown in FIG. 5, or the wall of the hole or slot as shown at 22 in FIGS. 6 and 7. As with the embodiment in FIGS. 1–4, it is also the case in connection with the embodiment in FIGS. 5, 6 and 7, that the wall of the pressure housing or flow tube 2 will preferably be made of steel or other pressure-proof, electrically conductive material.

As shown in FIG. 6, the reference electrode, here indicated by means of the reference numeral 22, may be located in the hole or slot 3 at a distance from the pressure side opening 3' thereof. The reference electrode 22 is on the side thereof facing the pressure medium 1 coated with a layer 23 of ceramic or glass-ceramic material which covers the entire cross-section of the said hole or slot 3, and this additional ceramic or glass-ceramic material 23 will preferably be flush with the pressure side 3" of the pressure housing or flow tube 2. The space between the sensor electrode and the reference electrode in FIG. 6 is indicated by means of the reference numeral 24.

As shown in FIGS. 5, 6 and 7, the reference electrode may be welded to the pressure housing or flow tube. Alternatively, the reference electrode, in particular in connection with the embodiment shown in FIGS. 6 and 7, may be screwed to the pressure housing or flow tube. It is also conceivable that the reference electrode may be snapped into place in the hole or slot in the pressure housing or flow tube. In FIG. 7 the sensor electrode 15 on the side thereof facing the said pressure medium 1 is preferably coated with a layer 14' of glass-ceramic material which covers the entire cross-section of the said hole or slot. This material 14' is preferably uniform with the other, homogeneous glass-ceramic material 14.

The thickness of the layer 23 of the ceramic or glass-ceramic material which distances the reference electrode from the pressure medium I is preferably in the range of 0.1 μm–10 mm. The thickness of the layer 14' of the glass-ceramic material which distances the sensor electrode 15 from the said dielectric fluid or element 24, will advantageously be in the range of 0.1 μm–10 mm.

The minimum thickness of the glass-ceramic material which in a radial direction in the hole or slot 3 distances the sensor electrode 15 from the wall material is advantageously in the range of 0.1 μm–10 mm. The advantage of placing a ceramic or glass-ceramic is material 23 on the outside of the reference electrode 22 is that the glass-ceramic material is so hard that there will be little or no cavitation effect in this layer. The cavitation effect that the pressure medium 1 might cause because of sand or grit in the pressure medium will either have a direct impact on the reference electrode 17, as shown in FIG. 5, or on the layer 23 which protects the reference electrode 22, or cause cavitation or wear on the reference electrode, as indicated by means of the reference numeral 17 in FIG. 5. In the event of impact on either the electrode 17 or the layer 23 and thus the electrode 22, there will be a change of distance in the gap between the sensor electrode 15 and the reference electrode 17; 22, which will bring about a chance in capacitance which can be registered by the signal processing unit 19 and relayed to the output 20 of the circuit 19.

In the event of cavitation effect, the thickness of the reference electrode 17 will change continuously, thus enabling the change in capacitance to be measured, also because the rigidity of the reference electrode 17 will decrease gradually and thus become less pressure-resistant.

What is claimed is:

1. A device for measuring at least one characteristic parameter of a medium at high pressure in a pressure housing, or pressure-resistant flow guide, with a wall of said housing or flow guide having a passage formed transversely therethrough, the device comprising:
    at least one capacitive sensor electrode which is responsive to said at least one parameter and is positionable in said passage;
    an electrical connection for connection to said at least one sensor in said passage; and,
    a homogeneous glass-ceramic material which extends around the at least one sensor electrode and the electrical connection and extends from the pressure side of the wall through said passage and hermetically seals the passage, and anchors said at least one sensor electrode and said electrical connection to the wall material and electrically insulates said at least one sensor electrode and said electrical connection from the wall material and the medium.

2. A device as claimed in claim 1, wherein said sensor electrode has a medium facing side and said sensor electrode includes an electrically conductive layer having a shape selected from the group consisting of circular, annular, oval, rectangular and polygonal shapes.

3. A device as claimed in claim 1, wherein the glass-ceramic material spaces the sensor electrode from the medium and has a thickness in the range of 0.1 μm to 10 mm, and a face of the glass-ceramic material is flush with a medium facing surface of the wall.

4. A device as claimed in claim 1, wherein the glass-ceramic material spaces the sensor electrode from the wall material by a distance in the range of 0.1 μm to 10 mm, and a face of the glass-ceramic material is flush with a medium facing surface of the wall.

5. A device as claimed in claim 1, including means for measuring at least one characteristic parameter of a medium at high pressure and high temperature.

6. A device for measuring at least one characteristic parameter of a medium at high pressure in a pressure housing, or pressure-resistant flow guide, with a wall of said housing or flow guide having a passage formed transversely therethrough, said at least one characteristic parameter being pressure of such medium or cavitation caused by contaminants in the medium during movement thereof, the device comprising:
    at least one capacitive sensor electrode which is responsive to said at least one parameter and is positionable in said passage;
    an electrical connection for connection to said at least one sensor in said passage;
    a reference electrode spaced from the sensor electrode by a dielectric and being in galvanic contact with the wall material; and
    a homogeneous glass-ceramic material which surrounds the electrical connection and at least one face of the at least one sensor electrode and extends from the at least one sensor electrode and partly through said passage and hermetically seals the passage, and anchors said at least one sensor electrode and said electrical connection to the wall material and electrically insulates said at least one sensor electrode and said electrical connection from the wall material.

7. A device as claimed in claim 6, wherein the reference electrode is located in the passage and is spaced from the medium by a layer of glass-ceramic material which covers the entire cross-section of the passage.

8. A device as claimed in claim 7, wherein said glass-ceramic material is flush with a medium facing surface of the wall.

9. A device as claimed in claim 8, wherein the glass-ceramic material spaces the reference electrode from the medium facing surface of the wall by a distance in the range of 0.1 μm to 10 mm.

10. A device as claimed in claim 6, wherein the sensor electrode has a medium facing side coated with a layer of glass-ceramic material which covers the entire cross-section of said passage.

11. A device as claimed in claim 10, wherein the layer of glass-ceramic material which covers the entire cross-section of the said passage on the medium facing side is uniform with the homogeneous glass-ceramic material surrounding the electrical connection.

12. A device as claimed in claim 10, wherein the glass-ceramic material spaces the sensor electrode from said dielectric by a distance in the range of 0.1 μm to 10 mm and a face of the glass-ceramic material is flush with a medium facing surface of the wall.

13. A device as claimed in claim 6, wherein a minimum thickness of glass-ceramic material in the range of 0.1 μm to 10 mm spaces the sensor electrode from a medium facing surface of the wall.

14. A device as claimed in claim 6, including means for measuring at least one characteristic parameter of a medium at high pressure and high temperature.

15. A device for measuring at least one characteristic parameter of a medium at a high pressure, said medium being related to a pressure housing or a pressure-resistant flow guide, said device comprising:
    at least one capacitive sensor electrode positioned in a passage which is formed transversely through a wall of said housing or flow guide, said electrode being responsive to said at least one characteristic parameter of such a medium;
    an electrical connection connected to said at least one sensor electrode in said passage; and
    a homogeneous glass-ceramic material which extends around the at least one sensor electrode and the electrical connection and extends from the pressure side of the wall a selected distance through said passage and hermetically seals the passage, and anchors said at least one sensor electrode and said electrical connection to the wall material and electrically insulates said at least one sensor electrode and said electrical connection from the wall material and any medium in the pressure housing or flow guide.

16. A device as claimed in claim 15, wherein the sensor electrode has a medium facing side and said sensor electrode includes an electrically conductive layer having a shape selected from the group consisting of circular, annular, oval, rectangular and polygonal shapes.

17. A device as claimed in claim 15, wherein the glass-ceramic material spaces the sensor electrode from the medium and has a thickness in the range of 0.1 μm to 10 mm, and a face of the glass-ceramic material is flush with a medium facing surface of the wall.

18. A device as claimed in claim 15, wherein the glass-ceramic material spaces the sensor electrode from the wall material by a distance in the range of 0.1 μm to 10 mm, and a face of the glass-ceramic material is flush with a medium facing surface of the wall.

19. A device as claimed in claim 15, wherein the wall of the pressure housing or flow guide is made from steel.

20. A device as claimed in claim 15, wherein the sensor electrode is connected to a sensor input on a capacitance-responsive signal processing circuit; and the wall material is connected to a reference input on the signal processing circuit.

21. A device as claimed in claim 15, including means for measuring at least one characteristic parameter of a medium at high pressure and high temperature.

22. A device for measuring at least one characteristic parameter of a medium at a high pressure, said medium being related to a pressure housing or pressure-resistant flow guide, said at least one characteristic parameter being pressure of such a medium or cavitation caused by contaminants in the medium during movement thereof, said device comprising:

at least one capacitive sensor electrode positioned in a passage which is formed transversely through a wall of said housing or flow guide, said electrode being responsive to said at least one characteristic parameter of such a medium;

an electrical connection connected to said at least one sensor electrode in said passage;

a reference electrode spaced from the sensor electrode by a dielectric and being in galvanic contact with the wall material;

a homogeneous glass-ceramic material which surrounds the electrical connection and a face of the at least one sensor electrode, and extends from the at least one sensor electrode and partly through said passage and hermetically seals the passage, and anchors said at least one sensor electrode and said electrical connection to the wall material and electrically insulates said at least one sensor electrode and said electrical connection from the wall material.

23. A device as claimed in claim 22, wherein said sensor electrode has a medium facing side and said sensor electrode includes an electrically conductive layer, and the reference electrode is galvanically connected an edge of the passage at a medium facing surface of the wall.

24. A device as claimed in claim 22, wherein the wall of the pressure housing or flow guide is made of an electrically conductive, pressure resistant material.

25. A device as claimed in claim 24, wherein the wall of the pressure housing or flow guide is made of steel.

26. A device as claimed in claim 22, wherein the reference electrode is located in the passage and is spaced from the medium by a layer of glass-ceramic material which covers the entire cross-section of the passage.

27. A device as claimed in claim 26, wherein said glass-ceramic material is flush with a medium facing surface of the wall.

28. A device as claimed in claim 27, wherein the glass-ceramic material spaces the reference electrode from the medium facing surface of the wall by a distance in the range of 0.1 μm to 10 mm.

29. A device as claimed in claim 26, wherein the sensor electrode has a medium facing side coated with a layer of glass-ceramic material which covers the entire cross-section of said passage.

30. A device as claimed in claim 29, wherein glass-ceramic material spaces the sensor electrode from said dielectric by a distance in the range of 0.1 μm to 10 mm, and a face of the glass-ceramic material is flush with a medium facing surface of the wall.

31. A device as claimed in claim 22, wherein the reference electrode is welded to the passage.

32. A device as claimed in claim 22, wherein the reference electrode is screwed into the passage.

33. A device as claimed in claim 22, wherein the sensor electrode has a medium facing side coated with a layer of glass-ceramic material which covers the entire cross-section of said passage.

34. A device as claimed in claim 33, wherein the layer of glass-ceramic material which covers the entire cross-section of the said passage on the medium facing side of the sensor electrode is uniform with the homogeneous glass-ceramic material surrounding the electrical connection.

35. A device as claimed in claim 22, wherein a minimum thickness of glass-ceramic material in the range of 0.1 μm to 10 mm spaces the sensor electrode from a medium facing surface of the wall.

36. A device as claimed in claim 22, wherein the sensor electrode is connected to a sensor input on a capacitive-responsive signal processing circuit; and the reference electrode is, via the wall material, connected to a reference input on the signal processing circuit.

37. A device as claimed in claim 22, including means for measuring at least one characteristic parameter of a medium at high pressure and high temperature.

* * * * *